(12) United States Patent
Dong et al.

(10) Patent No.: US 8,197,186 B2
(45) Date of Patent: Jun. 12, 2012

(54) FLANGE WITH AXIALLY EXTENDING HOLES FOR GAS TURBINE ENGINE CLEARANCE CONTROL

(75) Inventors: Zhifeng Dong, Cincinnati, OH (US); John Joseph Rahaim, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 948 days.

(21) Appl. No.: 11/771,333

(22) Filed: Jun. 29, 2007

(65) Prior Publication Data

US 2009/0003990 A1    Jan. 1, 2009

(51) Int. Cl.
    *F01D 25/14*  (2006.01)
    *F01D 25/24*  (2006.01)
(52) U.S. Cl. ..................... 415/116; 415/213.1
(58) Field of Classification Search ............... 415/116, 415/213.1, 220
    See application file for complete search history.

(56) References Cited

U.S. PATENT DOCUMENTS

| | | | |
|---|---|---|---|
| 4,023,919 A | | 5/1977 | Patterson |
| 4,762,462 A | * | 8/1988 | Lardellier .................... 415/177 |
| 5,048,288 A | * | 9/1991 | Bessette et al. ............. 60/226.1 |
| 5,203,162 A | * | 4/1993 | Burge ............................ 60/785 |
| 5,205,115 A | | 4/1993 | Plemmons et al. |
| 5,399,066 A | * | 3/1995 | Ritchie et al. ................ 415/115 |
| 5,605,438 A | | 2/1997 | Burdgick et al. |
| 5,980,201 A | * | 11/1999 | Benoist et al. ................ 415/115 |
| 5,993,150 A | * | 11/1999 | Liotta et al. .................. 415/115 |
| 6,149,074 A | * | 11/2000 | Friedel et al. ................ 239/127.1 |
| 6,185,925 B1 | * | 2/2001 | Proctor et al. ................ 60/806 |
| 6,848,885 B1 | | 2/2005 | Maclean |
| 6,925,814 B2 | * | 8/2005 | Wilson et al. ................. 60/785 |
| 7,165,937 B2 | | 1/2007 | Dong et al. |
| 7,571,614 B2 | * | 8/2009 | Lejars et al. .................. 60/796 |
| 2005/0111965 A1 | | 5/2005 | Lowe et al. |
| 2006/0120860 A1 | * | 6/2006 | Dong et al. ................. 415/173.1 |
| 2007/0140838 A1 | | 6/2007 | Estridge et al. |
| 2007/0140839 A1 | | 6/2007 | Bucaro et al. |

FOREIGN PATENT DOCUMENTS

| | | |
|---|---|---|
| EP | 0816639 A1 | 1/1998 |
| EP | 1138881 A2 | 10/2001 |
| EP | 1288444 A1 | 3/2003 |
| EP | 1923538 A2 | 5/2008 |
| FR | 2607198 | 11/1986 |
| FR | 2688539 | 3/1992 |
| GB | 2054741 | 2/1981 |
| GB | 2261708 | 5/1993 |

OTHER PUBLICATIONS

European Search Report, EP08158591, Dec. 6, 2010, 7 pages. European Search Report, EP08158589, Dec. 7, 2010, 8 pages.

* cited by examiner

*Primary Examiner* — Edward Look
*Assistant Examiner* — Sean J Younger
(74) *Attorney, Agent, or Firm* — William Scott Andes; Steven J. Rosen

(57) ABSTRACT

A gas turbine engine annular turbine casing having an annular shell, axially spaced apart forward and aft flanges extending radially outwardly from the shell, forward and aft case hooks depending radially inwardly from the annular shell, and an axially curved surface at an outer diameter of the aft flange. The axially curved surface may be a semi-spherical surface. The forward and aft case hooks may be located axially near or at the forward and aft flanges respectively. A circular row of holes may be axially disposed through the aft flange circumscribing the central axis and radially located between the outer diameter of the aft flange and the annular shell. An annular manifold spaced radially outwardly of the shell forming an annular space between the manifold and the shell and having impingement holes disposed through the manifold may be used for impinging cooling air on the axially curved surface.

7 Claims, 2 Drawing Sheets

FLANGE WITH AXIALLY EXTENDING HOLES FOR GAS TURBINE ENGINE CLEARANCE CONTROL

BACKGROUND OF THE INVENTION

Field of the Invention

This invention relates to thermal control of gas turbine engine rings such as flanges or pseudo-flanges as might be found in turbine tip clearance control apparatus and, more particularly, to thermal control surfaces upon which thermal control fluid is impinged on gas turbine engine rings and/or flanges.

Engine performance parameters such as thrust, specific fuel consumption (SFC), and exhaust gas temperature (EGT) margin are strongly dependent upon clearances between turbine blade tips and static seals or shrouds surrounding the blade tips. Active clearance control is a well known method to modulate a flow of cool or relatively hot air, generally referred to as thermal control air, from the engine fan and/or compressor and spray it on high and low pressure turbine casings to shrink the casings relative to the high and low pressure turbine blade tips during a flight. The air may be flowed to or sprayed or impinged on other static structures used to support the shrouds or seals around the blade tips such as flanges or pseudo-flanges which function as thermal control rings. It is highly desirable to be able to increase heat transfer between the thermal control air and the thermal control rings as compared to previous designs and, thus, make more efficient use of the thermal control air.

Typically, in current ACC designs, fan and/or compressor air is used to impinge on the HPT case pseudo-flanges to control case deflection at the scheduled time during the flight to achieve a desired tip clearance. The pseudo-flanges support shrouds surrounding turbine blade tips and thus heating or cooling the pseudo-flanges moves the shroud radially outwardly or inwardly respectively thus controlling tip clearances between the shrouds and the turbine blade tips. The spent air flow from forward flange or pseudo-flange impingement interferes with impingement flow on an aft pseudo-flange, thus, the heat transfer on the aft pseudo-flange is reduced, perhaps by half or more. Thus, a more effective design to improve heat transfer on the aft pseudo flange is desirable.

SUMMARY OF THE INVENTION

A gas turbine engine annular turbine casing includes an annular shell circumscribed about a central axis, axially spaced apart forward and aft flanges extending radially outwardly from the annular shell, and forward and aft case hooks depending radially inwardly from the annular shell of the casing. A circular row of axially extending cooling holes disposed through the aft flange, circumscribing the central axis, and radially located between the outer diameter of the aft flange and the annular shell.

In an exemplary embodiment of the turbine casing, the forward and aft case hooks are located axially near or at the forward and aft flanges respectively. A rear flange may extend radially outwardly from a rear end of the annular shell and a rear case hook may depend radially inwardly from the annular shell. The rear case hook being axially located at or near the rear end of the annular shell. In another exemplary embodiment of the turbine casing, the aft flange has an annular radially outwardly facing axially curved surface at an outer diameter of the aft flange and the forward and rear flanges have radially outwardly facing cylindrical surfaces at outer diameters of the forward and rear flanges. The axially curved surface may be a semi-spherical surface having a radius of curvature and the radius of curvature has an origin on the central axis.

The annular turbine casing may be incorporated in a gas turbine engine turbine assembly having a shroud assembly depending radially inwardly from the turbine casing and connected to the forward and aft case hooks. An exemplary embodiment of the shroud assembly includes a plurality of arcuate shroud segments coupled to segmented shroud hangers. The shroud hangers are supported by segmented shroud supports depending radially inwardly from the turbine casing and forward and aft ends of the shroud support are supported by the forward and aft case hooks respectively.

Another exemplary embodiment of the turbine assembly includes an annular manifold circumscribing the central axis and spaced radially outwardly of the annular shell forming an annular space between the manifold and the annular shell. Impingement holes may be disposed through the manifold and located for impinging cooling air radially inwardly on to the axially curved surface and radially outwardly facing cylindrical surfaces at of the forward and rear flanges.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
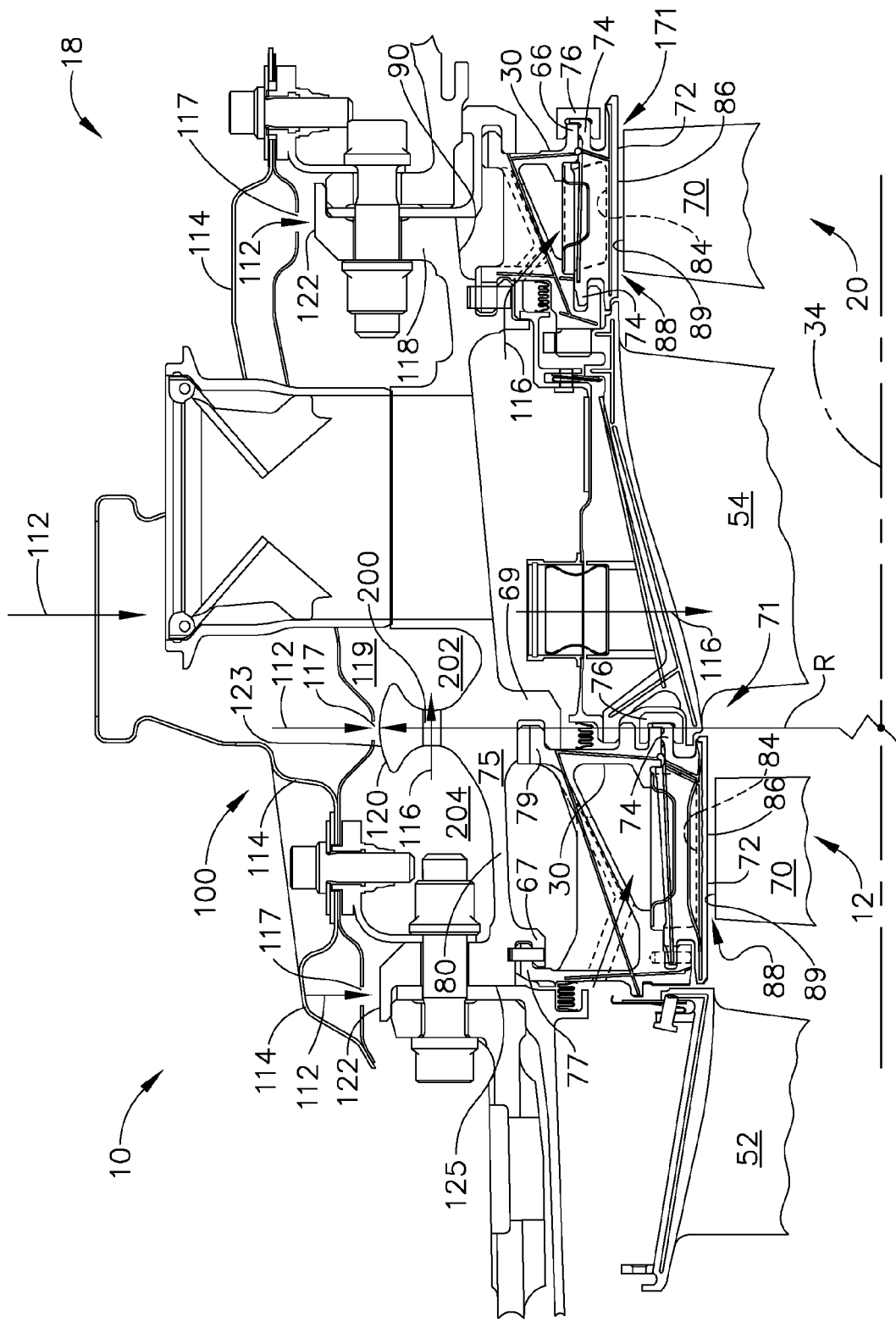
FIG. 1 is a schematical cross-sectional view illustration of a portion of an aircraft gas turbine engine clearance control system including a flange supporting a turbine shroud assembly.
Figure 2:
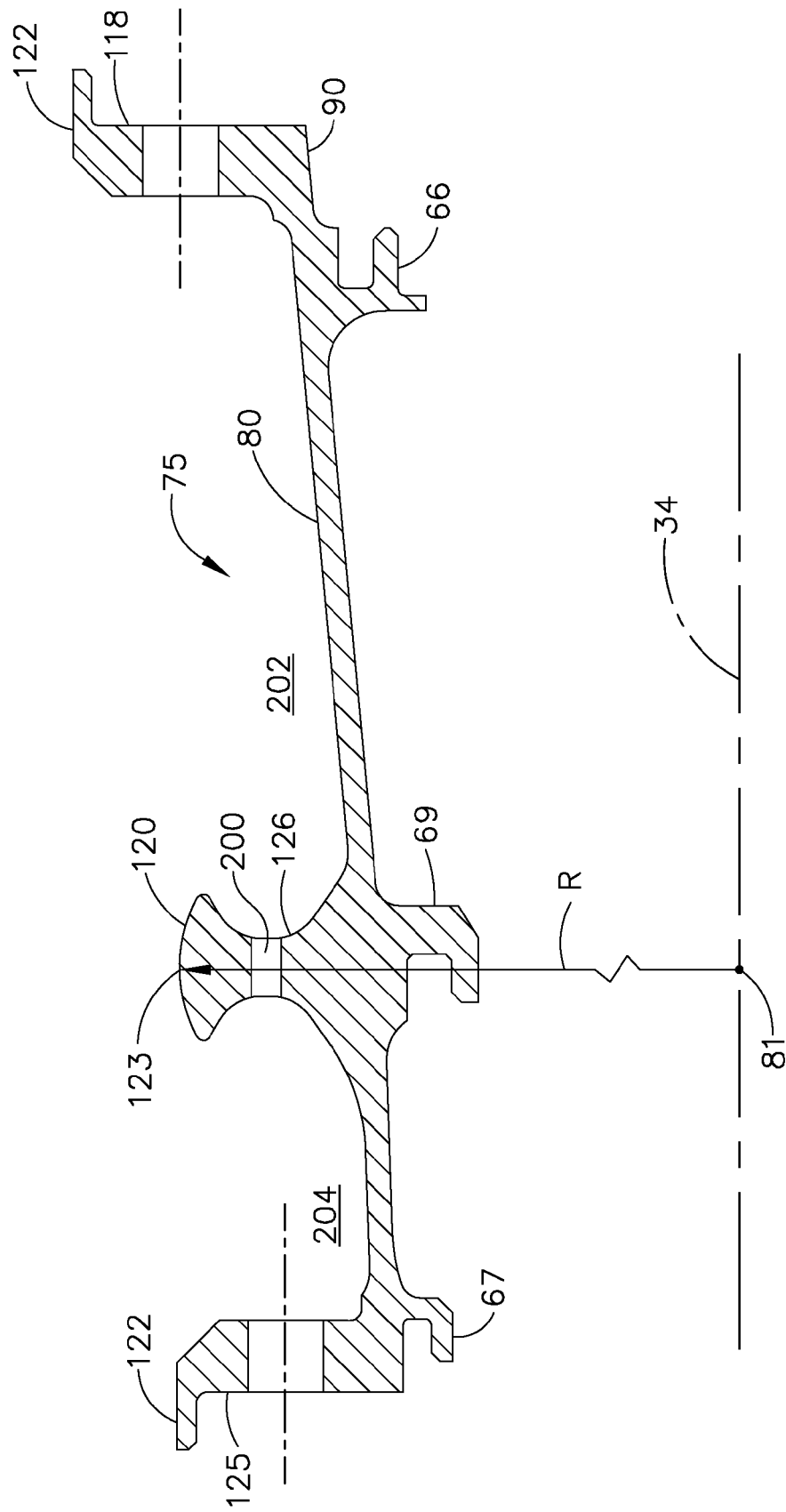
FIG. 2 is an enlarged schematical cross-sectional view illustration of the flange illustrated in FIG. 1.

Schematically illustrated in cross-section in FIGS. 1 and 2 is an exemplary embodiment of a turbine assembly 10 used as part of a clearance control system 100 for an aircraft gas turbine engine which facilitates controlling blade tip clearance 88 during engine operation. The clearance control system 100 is more fully described in U.S. Pat. No. 7,165,937 by Dong et al. issued Jan. 23, 2007 and incorporated herein by reference. The exemplary embodiment of the clearance control system 100 illustrated herein is for a first stage 12 of a high pressure turbine 18. A second stage 20 of the high pressure turbine 18 is downstream and aft of the first stage 12 of the high pressure turbine 18. First and second stage turbine nozzles 52 and 54 are located forward and upstream of the first and second stages 12 and 20 of the high pressure turbine 18. Annular high pressure turbine first and second stage shroud assemblies 71, 171 are circumscribed about a central axis 34 which typically coincides with an engine centerline. Each of the shroud assemblies circumscribes a row of high pressure turbine blades 70 and depends radially inwardly from a surrounding turbine casing 75.

The first stage shroud assembly 71 includes a plurality of arcuate shroud segments 72 coupled to segmented shroud hangers 74. The shroud hangers 74 are supported by segmented shroud supports 30 which depend radially inwardly from turbine casing 75. The shroud hangers 74 are connected to the shroud supports 30 and are held in place by C-clip 76. With regards to the first stage shroud assembly 71, axially spaced apart and radially outwardly unconstrained forward and aft flanges 125, 126 extend radially outwardly from an annular shell 80 of the casing 75. A radially outwardly unconstrained rear flange 118 extends radially outwardly from a rear end 90 of the annular shell 80 and a rear case hook 66 depends radially inwardly from the annular shell 80 and is axially located at or near the rear end 90 of the annular shell 80. Forward and aft ends 77, 79 of the shroud support 30 of the first stage shroud assembly 71 are supported by forward and aft case hooks 67, 69 respectively. The forward and aft case hooks 67, 69 depend radially inwardly from the annular shell 80 of the casing 75. The forward, aft, and rear case hooks 67, 69, and 66 are located axially near or at the forward, aft, and rear flanges 125, 126, and 118 respectively to improve thermal growth and shrinkage response to changes in thermal air impinging the flanges.

Adjacent shroud segments 72 are coupled together to form the first and second stage shroud assemblies 71, 171 circumscribing the turbine blades 70 about the central axis 34. Each shroud segment 72 includes a radially outer surface 84 and an opposite radially inner surface 86. The blade tip clearance 88 is defined between shroud inner surface 86 and tips 89 of the turbine blades 70. More specifically, the blade tip clearance 88 is defined as the distance between turbine blade tips 89 and an inner surface of turbine shroud segment 72. Thus, when turbine casing 75 and in particular forward and aft flanges 125, 126 are cooled, they shrink radially inwardly as does the first stage shroud assembly 71 and the plurality of arcuate shroud segments 72 of the first stage shroud assembly 71. In the exemplary embodiment, clearance control system 100 facilitates controlling the blade tip clearance 88 between rotor blade tips 89 and shroud inner surfaces 86. Clearance control system 100 is coupled in flow communication to a cooling air supply source via an annular manifold 114 circumscribed about the central axis 34. The manifold 114 is spaced radially outwardly of the annular shell 80 and an annular space 119 is disposed therebetween.

Cooling air 112 radially inwardly exits manifold 114 through impingement holes 117 and impinges on an annular radially outwardly facing and radially outer most axially curved surface 120 of the aft flange 126 extending radially outwardly from the annular shell 80 of the turbine casing 75. The axially curved surface 120 at an outer diameter 123 of the aft flange 126 is circumscribed about a radius of curvature R having an origin 81 on the central axis 34 and extending from the origin to the outer diameter 123 of the aft flange 126. The axially curved surface 120 is bowed radially outwardly, lies on a rim 130 of the aft flange 126, and extends axially in its entirety across a width 136 from a rim leading edge 132 to a rim trailing edge 134. The axially curved surface 120 extends axially along a single radially outwardly bowed curved line 138 from the rim leading edge 132 to the rim trailing edge 134. The axially curved surface 120 illustrated herein is a semi-spherical surface but other curved surfaces of revolution about the central axis 34 may be used. The semi-spherical axially curved surface 120 has the same radius of curvature R having an origin 81 on the central axis 34 and extending from the origin to the outer diameter 123 of the aft flange 126.

The axially curved surface 120 is an impingement surface and takes advantage of the Coanda effect which states that air tends to flow along a curved surface. The Coanda effect has an even greater effect on heat transfer for a spherically curved surface. The curved surface as opposed to previously used cylindrical surfaces, such as those illustrated in U.S. Pat. No. 7,165,937, provide greater heat transfer by making use of the Coanda effect. Cooling air 112 also exits manifold 114 to impinge on a radially outwardly facing and radially outer most cylindrical surfaces 122 of the forward and rear flanges 125, 118.

The cooling air 112 that has impinged on the cylindrical surfaces 122 of the forward flange 125 and the axially curved surface 120 of the aft flange 126 is referred to herein as spent air 116 which is exhausted from an annular space 119 between the manifold 114 and the annular shell 80 of the turbine casing 75. A circular row of axially extending cooling holes 200 disposed through the aft flange 126 (a pseudo-flange) circumscribes the central axis 34 and are radially located between the outer diameter 123 of the aft flange 126 and the annular shell 80. The cooling holes 200 allow the spent air 116 to flow into an aft cavity 202 between the aft and rear flanges 126, 118 respectively.

The spent air 116 is relatively cool compared to a case temperature of the annular shell 80 and the turbine casing 75. The aft flange 126 is cooled by the spent air 116 flowing through the cooling holes 200. This causes flows in a forward cavity 204 between the forward and aft flanges 125, 126 and the aft cavity 202 to be more active and enhance heat transfer between the impingement cooling air 200 and the spent air 116 and the flanges, the annular shell 80, and the turbine casing 75. The enhanced heat transfer provides better cooling effectiveness between the air flows and the flanges, the annular shell 80, and the turbine casing 75 which leads to a better control of the radial growth and shrinkage to achieve a desired blade tip clearance 88.

The aft flange 126 is also referred to as a pseudo-flange in the aircraft gas turbine engine industry. The cooing air supply source may be any cooling air supply source that enables clearance control system 100 to function as described herein, such as, but not limited to, fan air, an intermediate stage and/or a discharge stage of a compressor. In the exemplary embodiment, cooling air 112 is bled from an intermediate stage of a compressor for second stage turbine nozzle and shroud cooling. The clearance control system 100 is used to minimize the radial blade tip clearance 88 between the blade tips 89 and the shroud segments 72, particularly during cruise operation of the engine.

It is well known in the industry that small turbine blade tip clearances provide lower operational specific fuel consumption (SFC) and, thus, large fuel savings. The forward and aft flanges are provided to more effectively control blade tip clearance CL with a minimal amount of time lag and thermal control (cooling or heating depending on operating conditions) air flow. The forward and flanges are attached to or otherwise associated with the annular shell 80 of the turbine casing 75 and may be integral with the respective casing or shell of the casing (as illustrated in FIG. 2), bolted to or otherwise fastened to the shell or mechanically isolated from but in sealing engagement with the shell. The flanges may also be bolted flanges such as those found at the end of some casing shells. The flanges serve as thermal control rings provide thermal control mass to more effectively move the shroud segments 72 radially inwardly (and outwardly if so designed) to adjust the blade tip clearances.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. A gas turbine engine turbine assembly comprising:
an annular turbine casing having an annular shell circumscribed about a central axis,
axially spaced apart forward and aft flanges extending radially outwardly from the annular shell,
forward and aft case hooks depending radially inwardly from the annular shell of the casing,
a shroud assembly depending radially inwardly from the turbine casing and being connected to the forward and aft case hooks,
a circular row of axially extending cooling holes disposed through the aft flange circumscribing the central axis and radially located between an outer diameter of the aft flange and the annular shell,
a radially outwardly facing annular impingement surface of the aft flange at the outer diameter of the aft flange,
an annular manifold circumscribing the central axis and spaced radially outwardly of the annular shell,
an annular space disposed between the manifold and the annular shell,
impingement holes disposed through the manifold and located for spraying cooling air radially inwardly and directly on the annular impingement surface of the aft flange,
radially outwardly facing cylindrical surfaces at outer diameters of the forward and rear flanges and the radially outwardly facing annular impingement surface of the aft flange being axially curved, and
the axially curved annular impingement surface being semi-spherical, having a radius of curvature, and the radius of curvature having an origin on the central axis.

2. A gas turbine engine turbine assembly as claimed in claim 1 further comprising the forward and aft case hooks being located axially near or at the forward and aft flanges respectively.

3. A gas turbine engine turbine assembly as claimed in claim 2 further comprising:
a rear flange extending radially outwardly from a rear end of the annular shell,
a rear case hook depending radially inwardly from the annular shell, and
the rear case hook being axially located at or near the rear end of the annular shell.

4. A gas turbine engine turbine assembly comprising:
an annular turbine casing having an annular shell circumscribed about a central axis,
axially spaced apart forward and aft flanges extending radially outwardly from the annular shell,
a rear flange extending radially outwardly from a rear end of the annular shell,
forward and aft case hooks depending radially inwardly from the annular shell of the casing,
a shroud assembly depending radially inwardly from the turbine casing and being connected to the forward and aft case hooks,
a circular row of axially extending cooling holes disposed through the aft flange circumscribing the central axis and radially located between the outer diameter of the aft flange and the annular shell,
radially outwardly facing cylindrical surfaces at outer diameters of the forward and rear flanges, and
a radially outwardly facing axially curved annular impingement surface of the aft flange at an outer diameter of the aft flange,
an annular manifold circumscribing the central axis and spaced radially outwardly of the annular shell,
an annular space disposed between the manifold and the annular shell, and
impingement holes disposed through the manifold and located for spraying cooling air radially inwardly and directly on the axially curved surface and the cylindrical surfaces, and
the axially curved surface being a semi-spherical surface having a radius of curvature and the radius of curvature having an origin on the central axis.

5. A turbine assembly as claimed in claim 4 further comprising:
the shroud assembly including a plurality of arcuate shroud segments coupled to segmented shroud hangers,
the shroud hangers being supported by segmented shroud supports depending radially inwardly from the turbine casing, and
forward and aft ends of the shroud support being supported by the forward and aft case hooks respectively.

6. A turbine assembly as claimed in claim 5 further comprising the forward and aft case hooks being located axially near or at the forward and aft flanges respectively.

7. A turbine assembly as claimed in claim 4 further comprising the circular row of axially extending cooling holes operable to flow the cooling air therethrough after the cooling air is sprayed on the annular impingement surface.

* * * * *